UNITED STATES PATENT OFFICE.

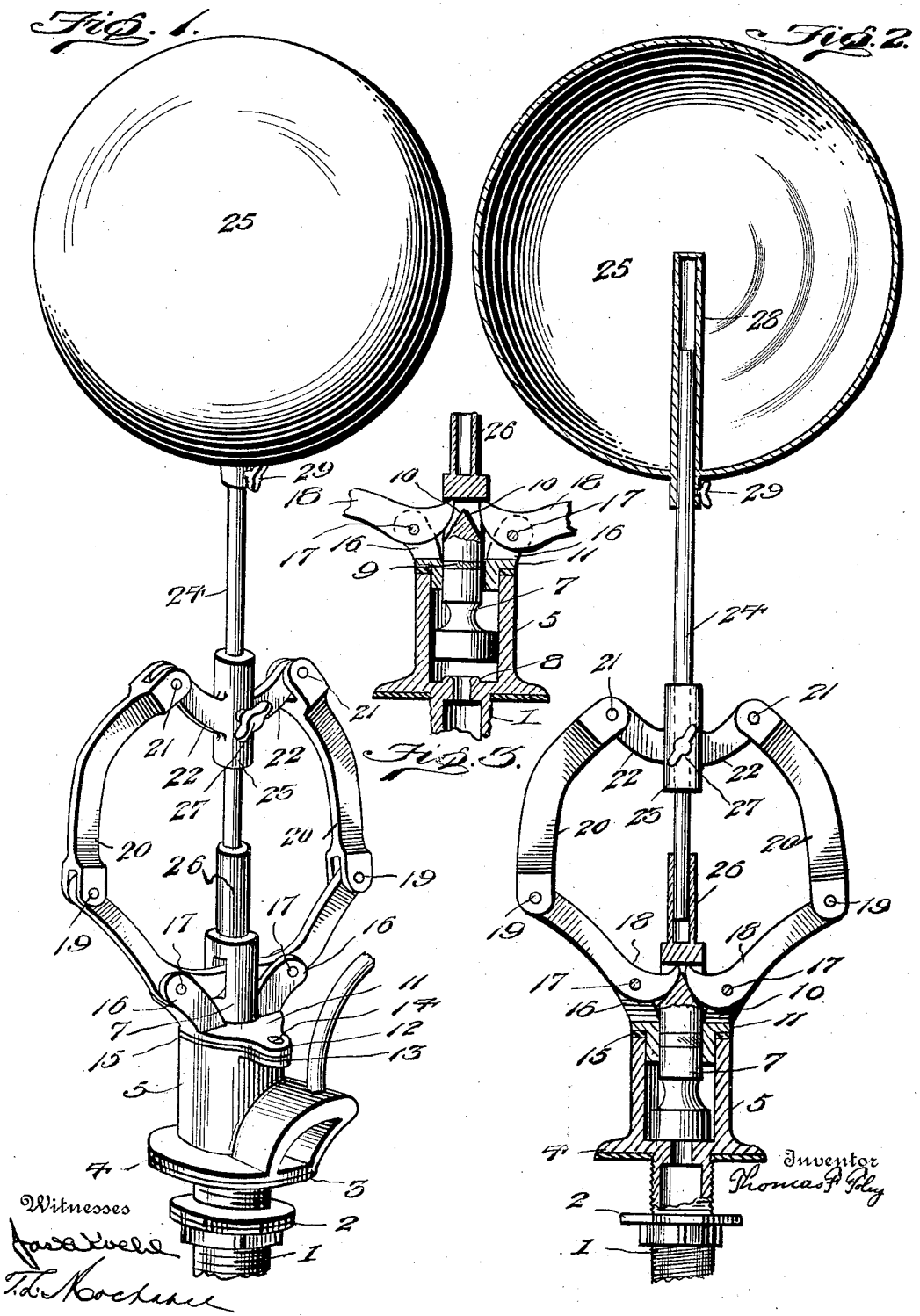

THOMAS F. FOLEY, OF WASHINGTON, DISTRICT OF COLUMBIA.

FLOAT-VALVE.

1,007,191.  Specification of Letters Patent.  Patented Oct. 31, 1911.

Application filed December 5, 1910. Serial No. 595,709.

*To all whom it may concern:*

Be it known that I, THOMAS F. FOLEY, a citizen of the United States, residing at Washington, in the District of Columbia, have invented certain new and useful Improvements in Float-Valves; and I do hereby declare the following to be a full, clear, and exact description of the invention, such as will enable others skilled in the art to which it appertains to make and use the same.

This invention relates to improvements in valves, and particularly to that class of valves known as float valves which are employed in connection with tanks for closets or the like, and the primary object of the invention is to provide a device of this character which is simple in construction; which can be easily secured to or detached from a tank and which has the valve or float positioned directly above the valve, so that the concentrated force of the float will be delivered directly from a plane above the valve.

Another object of the invention is to provide a device of the kind wherein a float valve is employed and wherein said float valve is positioned directly above the valve so that repairs can be made to the valve or parts thereof without interfering with the mechanism within the tank.

Another object of the invention is to provide a device of this character comprising a float and a valve actuated by said float, the float being provided with means whereby it may be susceptible to variations so that the amount of water entering the tank may be readily regulated and which at the same time is covered by the said float arranged directly above the valve and as its concentric force bearing thereon.

Another object of the invention is to provide a device of this character wherein the float may be easily and readily regulated so as to allow a certain amount of water to enter the tank and to be flushed therefrom when the outlet valve of the tank is opened.

With the above, and other objects in view, which will appear as the description of the invention progresses, the invention relates to the novel and combined features of the invention hereinafter fully described and claimed.

In the accompanying drawings there has been illustrated a simple and approved structure constructed in accordance with the present invention; the features therein illustrated, however, are to be understood as merely illustrative as minor details of construction within the scope of the claims appended to the specification may be made without departing from the spirit or sacrificing any of the advantages of the invention.

In the accompanying drawings: Figure 1 is a perspective view of a device constructed in accordance with the present invention, Fig. 2 is an elevation thereof, parts being shown in section, Fig. 3 is a sectional view illustrating the valve elevated from its seat.

In the accompanying drawings the numeral 1 designates the inlet pipe. This pipe is exteriorly threaded and is adapted for the reception of a nut 2, the said nut being adapted to engage the underface of a tank, which in the present instance has not been deemed necessary to illustrate it, and the said nut is adapted to tightly engage the tank against a suitable washer 3 which is provided upon the underface 4 of the valve casing 5. The valve casing is of the ordinary construction comprising a chamber having its lower walls offset or formed with a disk whereby the said casing may be readily seated upon the lower face of the tank. The casing 5 preferably comprises a cylindrical body and is further provided with a cylindrical opening, the same being adapted for the reception of a slidable valve 7. The lower face provided within the opening of the casing is formed with the valve seat 8, the latter adapted to be received by the lower face of the valve 7. The valve 7 comprises preferably a member which is cylindrical in cross section and which is adapted to project a suitable distance above the casing 5. The extension of the valve 7 is formed with an annular depression, the latter being adapted for the reception of a bushing 9. The bushing 9 is constructed of some suitable flexible material and which is adapted to prevent the outflow of water through the pipe 1 in the chamber 5, and the upper extremity of the extension of the valve is formed with diametrically opposite seats 10. Each of these seats have their inner walls curved or arcuate and the said seats are arranged diametrically opposite each other. The casing 5 is normally closed through the medium of a suitable cap 11, the said cap being centrally provided with an opening through which the extension of the valve 7 extends and the said cap is further provided with oppositely disposed ledges 12 which are adapted to coact with similar ledges 13 provided upon the casing 5. Each of the ledges 12 and 13 are formed with alining openings and the said openings are adapted for the reception of securing elements 14. The space between the upper face of the casing 5 and the underface of the cap 11 is adapted for the reception of a suitable compressible washer 15, and it will be readily noted that when desired the elements 14 may be removed from the ledges so that the operating parts of the device may be reached without the employment of other than ordinary tools. The cap 11 is further provided with oppositely disposed bifurcated arms 16 and the said arms are formed with pivots 17 which engage, what I term, the operating dogs 18 of the device. These dogs 18 are pivotally connected as at 19 with links 20, and the said links 20 having their opposite or free ends pivotally secured as at 21 to the arms 22 of an adjustable collar 23. The collar 23 is adapted for the reception of a rod 24 adjustably connected with a float valve 25 and the extremity of the said rod 24 which projects below the collar 23 is adapted to be received within a sleeve 26, which is integrally or otherwise provided upon the extension of the valve 7 and which serves as a guide for the said rod 24. The collar 23 is formed with a threaded opening and the said opening is adapted for the reception of a threaded thumb screw 27, whereby the rod may be adjustably connected with the collar 23. The float 25 is preferably of a spherical formation and it is to be understood that the float may be of a different formation if desired, and in the device illustrated in the accompanying drawings the float is centrally provided with, what I term, a socket 28. This socket is of a cross sectional formation corresponding with that of the rod 24 and has its upper end closed and its lower end opened and extending below the surface of the valve, as clearly illustrated in the drawings. The projecting portion of the member 28 is formed with a threaded opening and the said opening is adapted for the reception of a threaded retaining element, such as a thumb screw 29. By this arrangement, it will be noted that the float 25 is sustained, not only directly above the valve 7 but also adjustably connected in relation to the collar 23 and the member 28, so that the said float may be easily adjusted to provide for the amount of water entering the tank.

It will be noted that by reference to the several views of the drawings that the arcuate extensions of the members 18 do not contact with the upper surfaces provided by the arcuate pockets 10 except when the said members are brought to the position illustrated in Fig. 3 of the drawings and wherein the valve 7 is raised from its seat. By this arrangement it will be further noted that the dogs are allowed a certain amount of lost motion so that the float 25 will descend by gravity a predetermined distance before the edges 31 of the said dogs 18 contact with the upper horizontal surface 32 of the pockets or recesses of the valve 7. It will be further noted that the water will be allowed to enter the tank a certain distance before the float 25 is raised sufficiently to have its arcuate extensions 30 contact with the arcuate surface provided by the pockets of the valve.

From the above description, taken in connection with the accompanying drawings, the advantages of the device will it is believed become apparent to those skilled in the art to which the invention appertains. It is well known in the art of plumbing that the float valves commonly employed engage a large area of the tank and it is also known that when repairs are to be made to any part of the tank the said float valve becomes an obstacle which must be removed before the said repairs can be made. It is a primary object of the present invention to provide means whereby access to the tank may be had so that parts may be adjuqsted without the removal of the float valve and, as heretofore stated, the said float valve being in the way of other attachments, the obstacles heretofore enumerated will be effectually overcome. The common construction of floats and valves are also susceptible to disadvantages well known to the trade and while the said floats act as a leverage for sustaining the valve, it will be apparent that the least twist in the stem supporting the valve will render the same unreliable as to the amount of water in the tank. The valves and operating mechanisms therefor commonly employed are furthermore subjected to criticism for the reason that a person skilled in the art of plumbing, repairing the tank must either remove the float from the tank to obtain access to the remaining operative portions of the tank or else twist the stem supporting the valve. In most instances the float is either soldered or threadedly connected with the float. The disintegrating effects of the water acting upon the threads of the float and stem are liable to render the separable elements disconnectible, so that access to the other parts of the tank cannot be obtained without liability of breaking the parts of the float.

As heretofore stated, the precise construction of the device is not to be limited to the illustrations and changes in the minor details of construction, within the scope of the following claims, may, if desired, be made.

What is claimed is:—

1. In a valve of the class set forth, a casing, a vertically movable valve within said casing, a float positioned above the casing, a rod connected with the float and loosely engaging with the valve, valve-operating members, and pivoted members connected with the valve-operating members and with the rod of the float.

2. In a device for the purpose set forth, a vertically movable valve, a float positioned directly above the valve, a rod for the float, a vertically adjustable member having oppositely disposed arms connected with the float rod, said float rod having its lower portion loosely positioned within the upper portion of the valve, pivoted arms for actuating the valve, and link members connected with the said pivoted arms and with the arms of the adjustable member upon the valve stem.

3. In a device for the purpose set forth, a vertically movable valve, said valve having its upper portion provided with a sleeve, a rod engaging said sleeve, a float adjustably connected with said rod, an adjustable collar upon the rod, said collar being provided with oppositely disposed arms, links connected with the arms, dogs connected with the links, and said dogs having their free extremities engaging the valve, substantially as and for the purpose set forth.

4. A casing having an inlet opening, a vertically movable valve within said casing, said valve comprising an elongated body having its upper portion formed with oppositely disposed depressions and an upwardly extending sleeve, a rod loosely positioned within said sleeve, a float adjustably connected with said rod, a collar loosely positioned upon said rod, means for connecting the collar to the rod, oppositely disposed arms connected with the collar, links pivotally connected with the arms, dogs pivotally connected with the free ends of the links, said dogs being also pivotally connected with the casing and adapted to play within the oppositely disposed depressions of the valve, substantially as and for the purpose set forth.

5. In a device for the purpose set forth, a casing, a vertically movable valve within the said casing, said casing being provided with a lug, a cap for said casing, said cap being provided with a lug adapted to aline with the lug of the casing, means for connecting the lugs of the cap and the casing, a sleeve for the valve, a float, an adjustable rod secured to the float and loosely positioned within the sleeve, and means connected with the rod and cap for operating the rod as the float is actuated.

6. The combination with a casing, a vertically movable valve positioned within the casing, said valve being provided with oppositely disposed openings, the inner walls of said openings being of an arcuate formation, oppositely disposed dogs having arcuate faces pivotally connected with the casing, links pivotally connected with the dogs, a collar, said collar being provided with arms, each of said arms pivotally connected with one of the links, a rod adjustably connected with the collar, a float for the rod, and means connected with the float for adjustably connecting the said float with the rod.

7. In a device for the purpose set forth, a casing, a vertically movable valve connected with said casing, said valve being provided with oppositely disposed openings having their inner faces inclined, a pair of dogs pivotally connected with the casing and positioned within the oppositely disposed openings thereof, the valve having its upper portion formed with a sleeve, links pivotally connected with the dogs, a collar, said collar having oppositely disposed arms, a pivoted connection between each of the arms and one of the links, a rod passing through the collar, means for vertically adjusting the rod within the collar, the lower end of said collar adapted to play loosely within the sleeve of the valve, a float, said float being integrally formed with a socket, said socket adapted for the reception of the rod, and means for securing the rod within the socket.

8. The combination with a vertically movable valve, said valve being formed with oppositely disposed openings, the inner wall provided by said openings being inclined, pivoted dogs having under-curved faces adapted at all times to engage within the openings and to contact the inclined faces thereof when the valve is in one position and the upper faces when the valve is in its second or open position, links connected with the dogs, a collar having oppositely arranged arms, pivots connecting the links with the arms, a thumb screw carried by the collar, a rod positioned within the collar, a float having an integrally formed socket, said socket adapted for the reception of the upper end of the rod, the socket projecting beyond the float, said projecting portion being formed with a threaded opening, a thumb screw for said opening adapted to engage the rod, and the upper extremity of the valve being formed with a vertical sleeve adapted for the reception of the lower end of the rod.

In testimony whereof, I affix my signature, in presence of two witnesses.

THOMAS F. FOLEY.

Witnesses:
  Wm. J. Koerth,
  E. Edmonston, Jr.